United States Patent

Hamill

[11] Patent Number: 5,831,814
[45] Date of Patent: Nov. 3, 1998

[54] ELECTRICAL CENTER BUS PLATE ASSEMBLY

[75] Inventor: Brian David Hamill, Warren, Ohio

[73] Assignee: General Motors Corporation, Detroit, Mich.

[21] Appl. No.: 818,598

[22] Filed: Mar. 14, 1997

[51] Int. Cl.⁶ ..................................................... H02B 1/01
[52] U.S. Cl. .......................... 361/627; 361/641; 361/642; 361/826; 174/52.1; 174/52.2; 174/52.4; 439/76.2
[58] Field of Search ..................................... 361/627, 642, 361/646, 752, 826; 439/76.2; 174/52.1, 52.2, 52.3, 52.4

[56] References Cited

U.S. PATENT DOCUMENTS

| | | | |
|---|---|---|---|
| 4,684,765 | 8/1987 | Beck et al. | 174/68.5 |
| 4,781,621 | 11/1988 | Sugiyama et al. | 174/52.3 |
| 4,894,018 | 1/1990 | Phillips et al. | 439/81 |
| 4,963,099 | 10/1990 | Sato et al. | 439/76.2 |
| 5,023,752 | 6/1991 | Detter et al. | 361/399 |
| 5,067,905 | 11/1991 | Matsumoto et al. | 439/76 |
| 5,207,587 | 5/1993 | Hamill et al. | 439/76 |
| 5,285,011 | 2/1994 | Shimochi | 174/52.1 |
| 5,605,465 | 2/1997 | Kobayashi et al. | 439/76.2 |
| 5,653,607 | 8/1997 | Saka et al. | 439/76.2 |

Primary Examiner—Leo P. Picard
Assistant Examiner—Boris L. Chervinsky
Attorney, Agent, or Firm—Cary W. Brooks

[57] ABSTRACT

An electrical distribution center comprises a main bus plate assembly that is sandwiched between upper and lower auxiliary bus plate assemblies of a known type. The main bus plate assembly comprises stamped metal circuit components having bus strips sandwiched between upper and lower insulation plates that are permanently secured together. The stamped metal circuit components have male blade terminals that protrude through slots of the upper and lower insulation plates. The slots have laterally flexible side wall portions that are spread apart by embossments of the stamped metal circuit components to retain these components during the assembly process.

12 Claims, 4 Drawing Sheets

5,831,814

ELECTRICAL CENTER BUS PLATE ASSEMBLY

This invention relates generally to electrical centers for automobiles and more particularly to a bus plate assembly for such electrical centers.

BACKGROUND OF THE INVENTION

U.S. Pat. No. 5,023,752 granted to Gary C. Detter et al Jun. 11, 1991 discloses an electrical power distribution center that comprises a bus plate assembly in the form of a plurality of vertically stacked circuit layers that eliminate or reduce the need for splices in the conductors of wiring harnesses. Each circuit layer comprises a plurality of stamped metal circuit components that are seated in tracks formed in the surface of an electrical insulating board. The stamped metal circuit is components include male blade terminals that are perpendicular to the electrical insulating board. These male blade terminals project through slots extending through one or more of the electrical insulating boards. The circuit layers are stacked vertically and fastened inside a two-part housing by a plurality of bolts. When the circuit layers are fastened in place, some male blade terminals project through slots in bottom of the lower housing part to provide socket connectors for wiring harnesses. Other male blade terminals project upwardly from the stack of circuit layers and have double ended female terminals attached to them. Electric and electronic components are then plugged into the top of the top housing part and the double-ended female connectors located below the top. A detachable cover is then secured in place to protect the electric and electronic components that are plugged into the top of the housing.

This arrangement has been used successfully by the assignee of this invention. However, the vertically stacked arrangement of circuit layers is cumbersome and expensive to manufacture and assemble.

U.S. Pat. No. 5,207,587 granted to Brian D. Hamill et al May 4, 1993 discloses an electrical distribution center that has an improved bussing arrangement. The Hamill electrical distribution center has a main bus plate assembly that comprises a plurality of stamped metal circuit components that are insert molded in an insulation board. These stamped metal circuit components include several male blade terminals that project outwardly of the insulation board and that include wire-receiving slots. The main bus plate assembly is sandwiched between upper and lower auxiliary bus plate assemblies of the type that are disclosed in U.S. Pat. No. 4,684,765 granted to Lawrence R. Beck et al Aug. 4, 1987. Each of these bus plate assemblies include a plurality of wire circuit components in an insulated routing board that has slots extending through it.

This arrangement also has been used successfully by the assignee of this invention. While the main bus plate and auxiliary bus plate assemblies is less cumbersome than the stacked circuit plates of the first arrangement, the main bus plate assembly is still expensive to manufacture and assemble.

SUMMARY OF THE INVENTION

The object of this invention is to provide a bus plate assembly for an electric distribution center that comprises a plurality of stamped metal circuit parts and an insulation board that is economical to manufacture and assemble.

A feature of the invention is that the bus plate assembly has stamped metal circuit components that have male blade terminals that are inserted through slots of the insulation board easily so that an assembly having a high density of male terminal blades can be manufactured and assembled economically.

Another feature of the invention is that the bus plate assembly has stamped metal circuit components that have male blade terminals and an insulation board that has terminal slots that are configured so that the insertion force requirements are low.

Still another feature of the invention is that the bus plate assembly has stamped metal circuit components that are secured to an insulation board by lateral embossments that cooperate with laterally flexible sidewalls of the insulation board.

Yet another feature of the invention is that the bus plate assembly has an insulation board that remains flat when the stamped metal circuit components are secured to the insulation board by the lateral embossments.

Yet another feature of the invention is that the bus plate assembly has an insulation board with terminal slots that are wider than the thickness of the male blade terminals of the stamped metal circuit components to facilitate insertion of the male blade terminals into the terminal slots.

Still yet another feature of the invention is that the bus plate assembly has embossments on the stamped metal circuit components that cooperate with specially shaped terminal slots to assure that the male terminals are centered in the terminal slots of the insulation board.

These and other objects, features and advantages of the invention will become apparent from the description below, which is given by way of example with reference to the accompanying drawings.

DESCRIPTION OF THE PREFERRED EMBODIMENT

Figure 1:
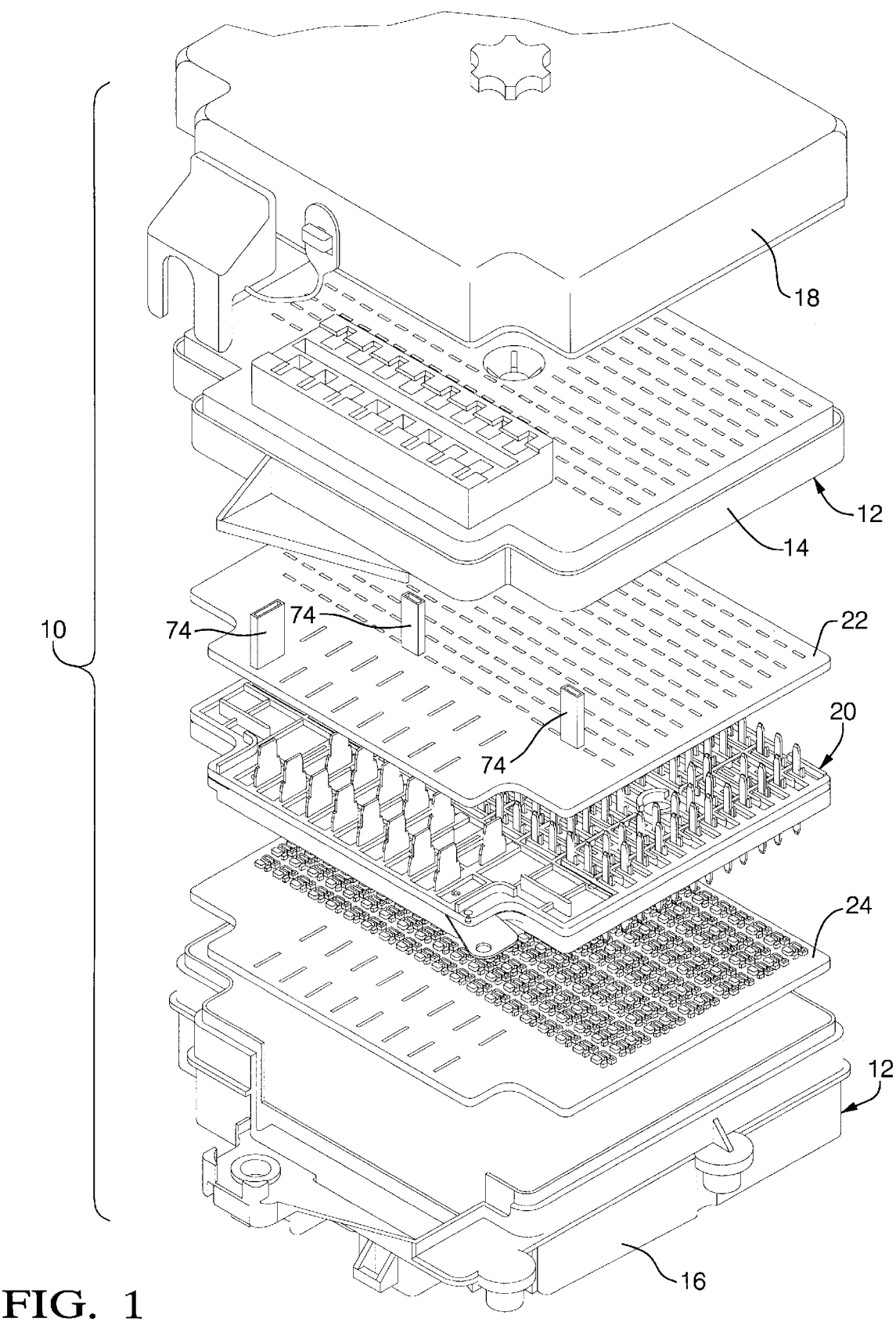
FIG. 1 is an exploded perspective view of an electrical distribution center in accordance with the invention.

Referring to FIG. 1, an electrical distribution center 10 provides an electrical interconnect between electrical and electronic devices such as mini-fuses, maxi-fuses and relays (not shown) that are plugged into the top of the housing 12 of the electrical distribution center and electrical connectors (not shown) of electrical wiring harnesses that are plugged into socket connectors in the bottom of the housing 12. See for instance U.S. Pat. Nos. 5,023,752 and 5,207,587 discussed above and which are incorporated herein by reference.

The electrical distribution center 10 typically includes a housing 12 that has an upper housing part 14 and a lower housing part 16 that are fastened together in a suitable manner such as by bolts as shown in two patents referenced above. A cover 18 is also commonly detachably fastened to the upper housing part 14 to protect the electrical and electronic devices that are plugged into the top of the housing 12.

The electrical distribution center 10 typically includes one or more bus plate assemblies that are disposed within the housing 12 to make the desired electrical interconnections between the devices that are plugged into the top of the housing 12 and the wiring harness connectors that are plugged into the socket connectors in the bottom of the housing 12. In this particular example, the electrical distribution center includes a main bus plate assembly 20 and upper and lower auxiliary bus plate assemblies 22 and 24 which are illustrated in more detail in FIG. 2.

Figure 2:
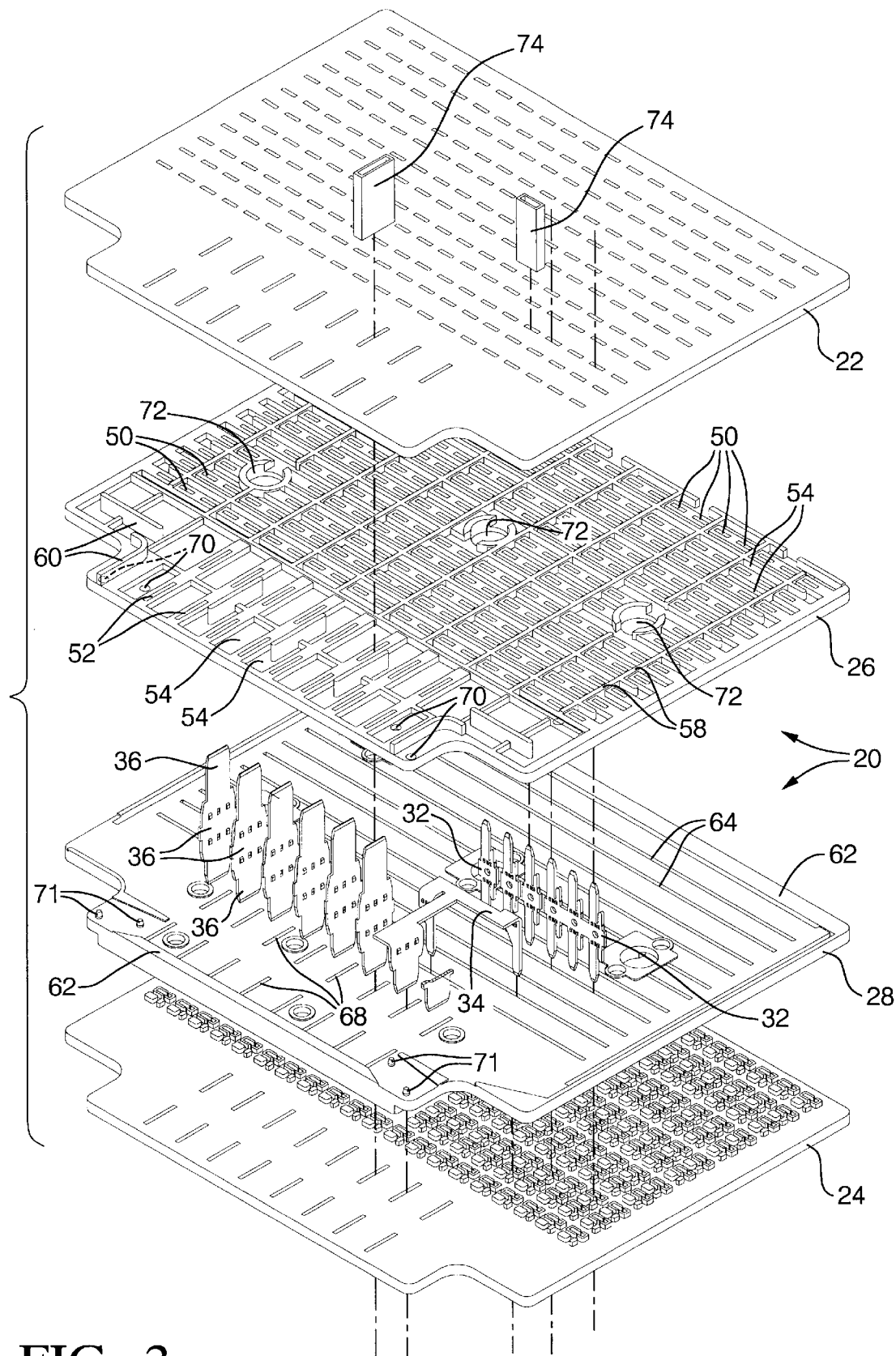
FIG. 2 is an exploded perspective view of internal components of the electrical distribution center shown in FIG. 1.
Figure 3:
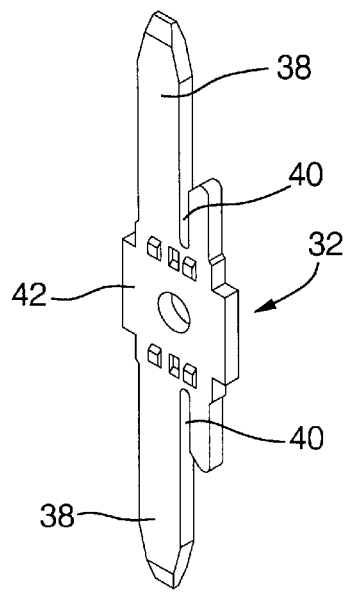
FIGS. 3, 4 and 5 are perspective views of exemplary stamped metal circuit components of the electrical distribution center shown in FIGS. 1 and 2.
Figure 4:
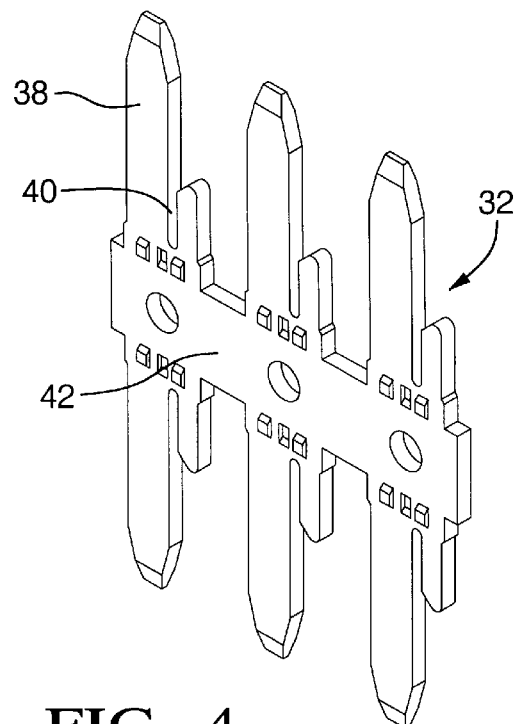
Figure 5:
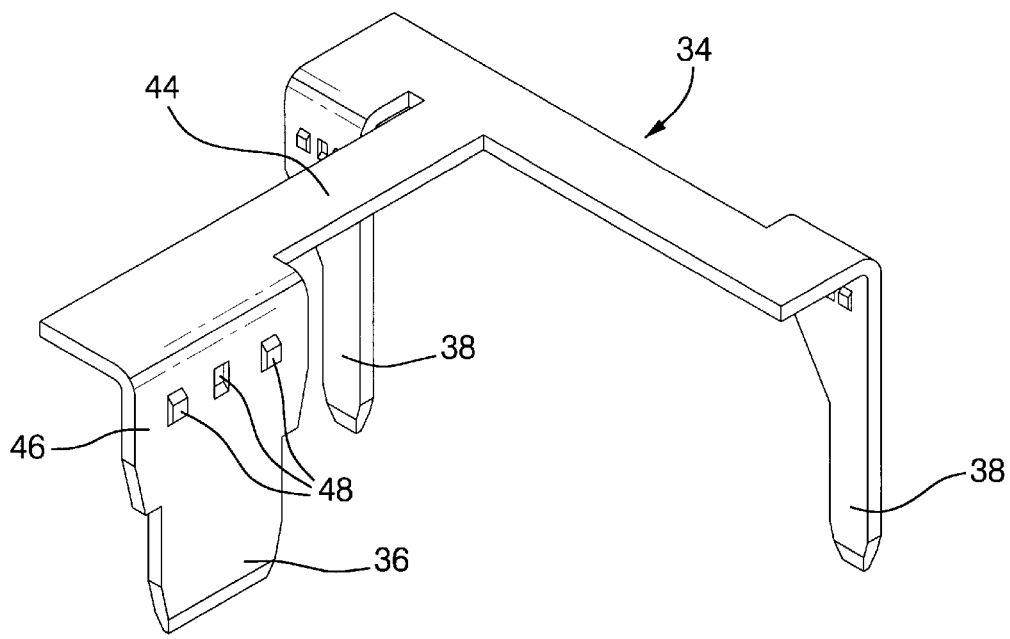

The main bus plate assembly 20 comprises an upper insulation board 26, a lower insulation board 28 and several stamped metal circuit components of various types and shapes (such as the circuit components 30, 32 and 34 shown in FIGS. 2–9) that are assembled to the upper and lower insulation boards 26 and 28 in a predetermined pattern. Each of these circuit components includes male blade terminals that protrude outwardly of the insulation board 26 and/or the insulation board 28. One typical circuit component 30 is generally planar and includes two wide male blade terminals 36 extending in opposite directions so that one male blade terminal extends 36 outwardly of each insulation board 26 and 28. Such circuit components are typically used in primary high voltage circuits. Another typical circuit component 32 is also generally planar and includes two narrow male blade terminals 38 extending in opposite directions that are each associated with a wire receiving slot 40. Such circuit components are typically used in secondary low voltage circuits. These components may comprise several male blade terminals 38 interconnected by a coplanar carrier or bus strip 42 as shown in FIG. 4. The carrier strip 42 mechanically and electrically connects all of the male blade terminals 38 and wire receiving slots 40 attached to the carrier strip. Another typical circuit component 34 comprises a number of male blade terminals mechanically and electrically interconnected by a transverse carrier or bus strip 44 as shown in FIGS. 2 and 5. Circuit component 34 is shown as having one wide male blade terminal 36 and two narrow male blade terminals 38 (without wire receiving slots) that extend in the same direction so that all three male blade terminals protrude out of the lower insulation board 28. However any number of wide and narrow male blade terminals may be connected by a transverse carrier strip and the male blade terminals may extend in either or both directions depending upon circuit requirements.

Each of the stamped metal circuit components 30, 32 and 34 include at least one male blade terminal that projects outwardly of a coplanar base portion 46 of the stamped metal circuit component. The base portion 46 is embossed to fasten the stamped metal circuit component to the insulation boards 26 or 28 and accurately locate the male blade terminal as explained below. Each such base portion 46 has at least one lateral embossment 48 and preferably a plurality of lateral embossments with at least one lateral embossment extending in each lateral direction. The patent drawing illustrates a suitable arrangement in which base portion 46 has three lateral embossments 48 with a middle lateral embossment extending in one lateral direction and lateral embossments on each side of the middle lateral embossment extending in an opposite lateral direction as best shown in FIGS. 6, 7, 8 and 9.

Figure 6:
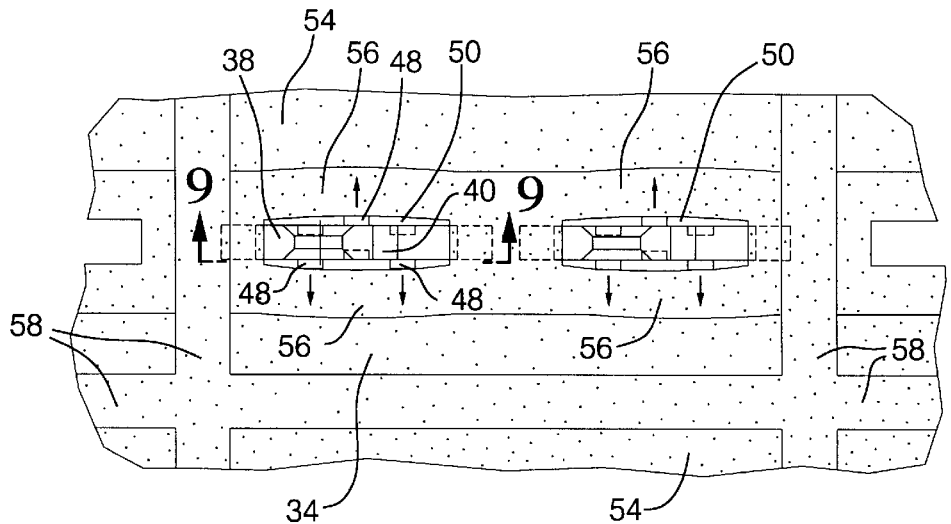
FIG. 6 is a fragmentary top view of a main bus plate assembly of the electrical distribution center shown in FIGS. 1 and 2.

Referring now to FIGS. 1, 2 and 6, the upper insulation board 26 has a plurality of slots that extend through the insulation board 26 and that are sized to receive the various male blade terminals described above. Typically, the major portion of the upper insulation board 26 has several parallel rows of narrow slots 50 for receiving the narrower male blade terminals 38 including their associated wire receiving slots 40 if any. The insulation board 26 also has several wide slots 52 for the wider male blade terminals 36 that in this particular example are transversely oriented with respect to the several parallel rows of narrow slots 50.

Figures 7, 8, 9:
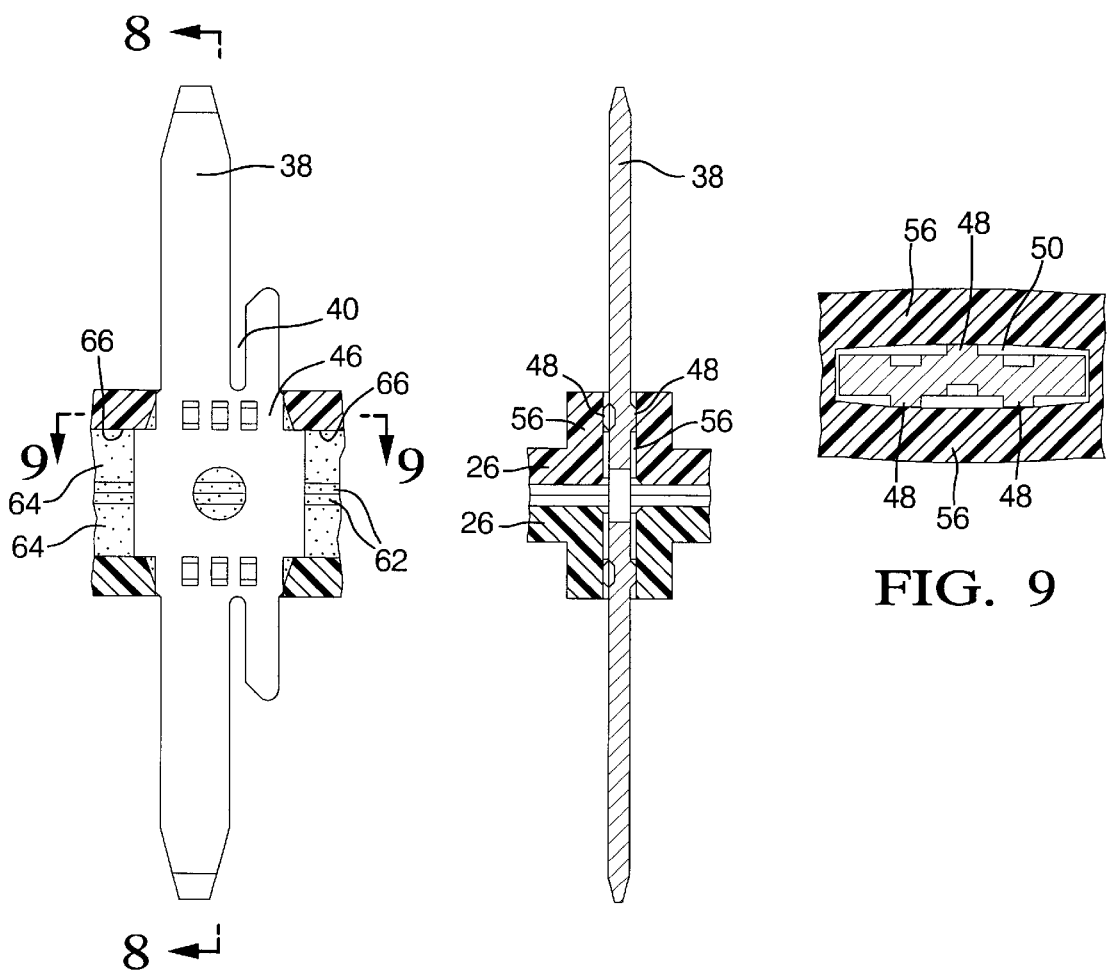
FIG. 7 is a section taken substantially along the line 7—7 of FIG. 6 looking in the direction of the arrows.
FIG. 8 is a section taken substantially along the line 8—8 of FIG. 7 looking in the direction of the arrows.
FIG. 9 is a section taken substantially along the line 9—9 of FIG. 7 looking in the direction of the arrows.

The outer surface of the upper insulation board 26 has several parallel grooves 54 so that each terminal slot 50 or 52 has outer side wall portions 56 that are laterally flexible as best shown in FIGS. 6, 8 and 9. In order to provide the requisite lateral flexibility, grooves 54 typically have a depth that is more than half of the thickness of the insulation board 26 in the slot area as shown in FIG. 8. The outer surface of the upper insulation board 26 also has a generally rectangular pattern of ribs 58 that extend above the outer surface of the upper insulation board 26 where the slots 50 and 52 exit. Ribs 58 support and locate the upper auxiliary bus plate 22. The outer surface of the upper insulation board 26 also includes additional ribs 60 for locating bus plate 22 laterally and the upper insulation board 26 within the upper housing part 14.

The inner surface of the upper insulation board 26 is similar to that of the lower insulation board 28. It has a peripheral rib 62 that engages a matching peripheral rib 62 of the lower insulation board 28 to provide space for the transverse carrier strips 44 of circuit components such as the circuit component 34 and space for the middle portion of coplanar carrier strips 42 of circuit components such as the circuit components 32 shown in FIG. 4. The inner surface also has a series of deep parallel grooves 64 that align with the rows of narrow terminal slots 50 so as to provide stop shoulders 66 in the inner portions of the narrow terminal slots 50 and room for the edges of the coplanar carrier strips 44 when such carrier strips are used. The inner surface also has wider individual grooves 68 for the wide terminal slots 52 so as to provide stop shoulders in the inner portions of the wide terminal slots 52.

The upper insulation board 26 also has a number of small holes 70 and integral nibs (not shown) extending from the inner surface for fastening the upper and lower insulation boards 26 and 28 together. The upper insulation board has a number of large holes 72 that are used to fasten the electrical center 10 together by bolts.

The lower insulation board 28 is exactly the same as the upper insulation board 26 with regard to formation of the terminal slots 50 and 52 for the male blade terminals 36 and 38. The lower insulation board 28 is essentially the same or similar in other respects. For instance, the lower insulation board 28 has ribs 58 for locating the lower auxiliary bus plate assembly 24, ribs 60 for locating the lower insulation board 28 in the lower housing part 16 and a plurality of small holes 70 and integral nibs 71. The pattern of the small holes and nibs 71 of the lower insulation board 28, however, is opposite that of the upper insulation board 26 so that each insulation board has nibs that fit in small holes of the other.

The main bus plate assembly 20 is assembled in the following matter. The several stamped metal circuit component, such as the components 30, 32 and 34, are assembled to one insulation board, such as the upper insulation board 26, by inserting the male blade terminals 36 and 38 into the appropriate slots 50 and 52 at the inner surface of the insulation board 26 tip end first. Male blade terminals 38 are guided into the slots 50 by the blade tips and the slot entrances, both or which are chamfered in both directions as best shown in FIGS. 7 and 8 to assist the male blade terminal insertion. The male blade terminals 38 are inserted until seated against the stop shoulders 66 in slots 50. Insertion forces are low because the width of each slot 50 is greater than the thickness of the male blade terminal 38 inserted into it and because outer side wall portions 56 flex laterally and spread apart when the embossments 64 are forced into the outer portions of the slots 50 as best shown in FIG. 9. The terminal slots 52 are also wider than the thickness of male blade terminals 36 and the terminal slots 52 also have outer side wall portions that are laterally flexible so that the male blade terminals 36 are pressed into the terminal slots 50 in the same way. The low insertion force requirements permit several and in some instances, all of the stamped metal circuit components to be machine assembled to the upper insulation board 26 at the same time. At least one male blade terminal of each stamped metal circuit component has an embossed coplanar base 46 that cooperates with a terminal slot 50 or 52 of the upper insulation board 26. However, for stamped metal circuit components having several blade terminals, preferably all or most of the male blade terminals have such an embossed base 46.

After the stamped metal components have been assembled to one insulation board, the components are then assembled to the second insulation board in the same manner. Thus, the oppositely extending male blade terminals 36 and 38 are inserted into the proper slots 50 and 52 of the lower insulation board 28 until the oppositely extending male blade terminals 36 and 38 engage the stop shoulders and the embossments 46 are firmly gripped by the flexible lateral walls 56 of the terminal slots 50 and 52 in the second insulation board. As indicated above, at least one and preferably all of oppositely extending male blade terminals have an embossed base portion 46 so that the stamped metal circuit components are also firmly gripped by the lower insulation board 28. The nibs 71 of the respective insulation boards are then heat staked to permanently secure the insulation boards 26 and 28 together and insulate the bussing strips 42 and 44 of the stamped metal circuit components 30, 32 and 34.

The auxiliary bus plate assemblies 22 and 24 are then assembled to the main bus assembly 20 by pressing the projecting male blade terminals through the appropriate slots of the insulation boards of these auxiliary assemblies. The construction and cooperation of the auxiliary bus plate assemblies 22 and 24 with the wire receiving slots 40 of terminals 38 are well known and described above in general terms in connection with U.S. Pat. No. 4,684,765 which is hereby incorporated by reference.

The auxiliary bus plate assemblies 22 and 24 with the main bus plate 20 sandwiched between them are then assembled into the lower housing part 16 and double ended female terminals 74 are connected to the male blade terminals 36 and 38 protruding above the upper auxiliary bus plate assembly 22. The upper housing part 12 is then attached to the lower housing part 14 housing part 14 is then attached to lower housing part 16 securing the three bus plate assemblies within the housing 12.

The electrical distribution center 10 is now ready for providing an electrical interconnection between electrical and electronic devices such as mini-fuses, maxi-fuses and relays that are plugged into the top of housing 12 and electrical wiring harnesses that are plugged into socket connectors in the bottom of housing 12.

While the main bus plate assembly 20 has been shown in combination with two auxiliary bus plate assemblies 22 and 24, the main bus plate assembly of this invention can be used alone or with any number of auxiliary bus plate assemblies. In other words the invention has been described in an illustrative manner, and it is to be understood that the terminology, which has been used, is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

I claim:

1. An electrical distribution center comprising;

a bus plate assembly that includes a plurality of stamped metal circuit components and a first insulation board for fixing the stamped metal circuit components in a predetermined pattern, each of the stamped metal circuit components having at least one male blade terminal portion that projects outwardly of a base portion of the stamped metal circuit component, the base portion having at least one lateral embossment, the first insulation board having a slot extending through the insulation that receives the male blade terminal portion, the slot being partly defined by a pair of laterally spaced flexible side walls, and wherein the first insulation board has a surface that includes a groove formed therein adjacent each flexible side wall to facilitate lateral movement of the adjacent flexible side wall when the male blade terminal portion is inserted into the slot, and the laterally spaced flexible side walls being spaced apart by a distance that is less than the thickness of the base portion including the lateral embossment so that the laterally spaced flexible side walls are laterally spread apart when the male blade terminal is inserted through the slot to biasingly retain the male blade terminal portion and the stamped metal circuit component to the insulation board and so that the terminal is gripped by the side walls.

2. The electrical distribution center as defined in claim 1 wherein the side walls of the slots are spaced apart by a distance that is less than the thickness of the male blade terminal portion that is received in the slot.

3. The electrical distribution center as defined in claim 1 wherein the male blade terminal portion and the base portion are coplanar and the base portion has a plurality of lateral embossments with at least one lateral embossment extending in each lateral direction.

4. The electrical distribution center as defined in claim 1 wherein some of the stamped metal circuit components have a plurality of male blade terminals that project outwardly of a base portion of the stamped metal circuit component, the base portion has a plurality of lateral embossments for each male blade terminal and the first insulation board has a slot for each blade terminal that is partly defined by a pair of laterally spaced flexible side walls.

5. The electrical distribution center as defined in claim 1 wherein:

the bus plate assembly includes a second insulation board that is juxtaposed an inner surface of the first insulation board for fixing the stamped metal circuit components in a predetermined pattern, some of the stamped metal circuit components have at least one second male blade terminal that projects outwardly of a second base portion of the stamped metal circuit component in an opposite direction, the second base portion has at least one second lateral embossment that is vertically spaced from the lateral embossment, the second insulation board has a second slot extending through the second insulation board that receives the second male blade terminal, and the second slot is partly defined by a pair of laterally spaced flexible side walls that are spaced apart by a distance that is less than the thickness of the second base portion including the second lateral embossment so that the laterally spaced flexible side walls are spread apart when the second male blade terminal is inserted through the second slot to biasingly retain the second male blade terminal and the stamped metal circuit component to the second insulation board.

6. The electrical distribution center as defined in claim 5 wherein the first insulation board and the second insulation board are secured to each other permanently.

7. An electrical distribution center as set forth in claim 1 wherein the first insulation board is a single piece.

8. An electrical distribution center comprising:

a bus plate assembly that includes a plurality of stamped metal circuit components and an insulation board for fixing the stamped metal circuit components in a predetermined pattern;

each of the stamps metal circuit components having at least one terminal portion that projects outwardly of a base portion of the stamped metal circuit component, the base portion having at least one lateral embossment, the insulation board having a slot extending therethrough for receiving the male blade terminal portion, the slot being partly defined by pair of laterally spaced flexible side walls, the insulation board further including a groove formed therein adjacent each side wall, and the laterally spaced flexible side walls being spaced the distance that is less than the thickness of the base portion including the lateral embossment so that the lateral spaced flexible side walls spread apart laterally when the terminal portion is inserted through the slot to retain the terminal and the stamped metal circuit component to the insulation board and so that the terminal is gripped by the laterally spaced flexible side walls.

9. An electrical distribution center as set forth in claim 8 wherein the insulation board is a single piece.

10. An electrical distribution center for providing electrical interconnections between electrical and electronic devices and electrical connectors of wire harnesses comprising;

a bus plate assembly that includes a plurality of stamped metal circuit components and an insulation board for fixing the stamped metal circuit components in a predetermined pattern, each of the stamped metal circuit components having at least one male blade terminal portion that projects outwardly of a base portion of the stamped metal circuit component, the base portion having at least one lateral embossment, the insulation board having a slot extending through the insulation that receives the male blade terminal portion, the slot being partly defined by a pair of laterally spaced side walls that include laterally flexible portions, and the laterally spaced portions being spaced apart by a distance that is less than the thickness of the base portion including the lateral embossment so that the laterally flexible portions of the side walls are spread apart when the male blade terminal is inserted through the slot to biasingly retain the male blade terminal and the stamped metal circuit component to the insulation board, and wherein the male blade terminal and the base portion are coplanar and the base portion has a plurality of lateral embossments with at least one lateral embossment extending in each lateral direction.

11. The electrical distribution center as defined in claim 10 wherein the base portion has three lateral embossments in which a middle lateral embossment extends in one lateral direction and lateral embossments on each side of the middle lateral embossment extend in an opposite lateral direction.

12. An electrical distribution center comprising:

a bus plate assembly that includes a plurality of stamped metal circuit components and an insulation board for fixing the stamped metal circuit components in a predetermined pattern;

each of the stamps metal circuit components having at least one male blade terminal portion that projects outwardly of a base portion of the stamped metal circuit component, the base portion having at least one lateral embossment, the insulation board having a slot extending therethrough for receiving the male blade terminal portion, the slot being partly defined by pair of laterally spaced flexible side walls, and the laterally spaced flexible side walls being spaced the distance that is less than the thickness of the base portion including the lateral embossment so that the lateral spaced flexible side walls spread apart laterally when the male blade terminal portion is inserted through the slot to retain the male blade terminal and the stamped metal circuit component to the insulation board and so that the terminal is gripped by the laterally spaced flexible side walls, and wherein the slot extending through the insulation plate has an internal stop shoulder.

\* \* \* \* \*